July 23, 1968 J. A. MATTOR ET AL 3,394,395
PHOTOSENSITIVE MEDIUM COMPRISING A FURFURYLIDENE, A PRIMARY
AROMATIC AMINE AND A LOWER HALOALKANE
Filed April 21, 1967 3 Sheets-Sheet 1

FURFURYLIDENE COLOR FORMERS
TYPE I
(FURFURYLIDENES-IMINES)

MONOFURYLIDENES

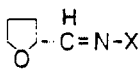

DIFURFURYLIDENES
(PREFERRED)

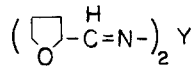

WHERE X IS:

(1) -OH (2) 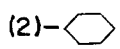

(3) 

(4) 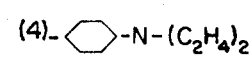

(5) 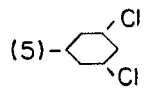

(6) 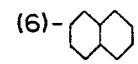

(7) 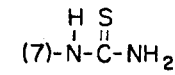

WHERE Y IS:

(10) ABSENT (AZINE STRUCTURE)

(11) 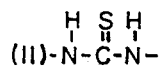

(12) 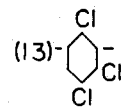   Z IS -H(12a); -CH (12b)
OR -N-C-CH$_3$(12c)
            ‖
            O

(13) 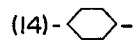

(14) 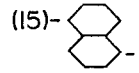

(15) 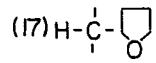

(16) 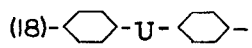   BOTH Z'S ARE EITHER
-H(16a); OR CH$_3$(16b)

(17) H-C- 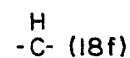

FURANACROLEINS

(20)

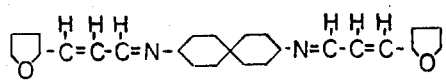

(18) 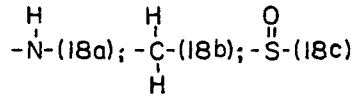

WHERE U IS:

*INVENTORS:*
JOHN A. MATTOR
LAWRENCE PRICE
BY,
*Russell, Chittick & Pfund*
ATTORNEYS July 23, 1968     J. A. MATTOR ET AL     3,394,395
PHOTOSENSITIVE MEDIUM COMPRISING A FURFURYLIDENE, A PRIMARY
AROMATIC AMINE AND A LOWER HALOALKANE
Filed April 21, 1967     3 Sheets-Sheet 2

FURFURYLIDENE COLOR FORMERS
TYPE II
(CYCLIC ACETALS)

ONE FURAN RING     TWO FURAN RINGS
                                                             (MUCH PREFERRED)

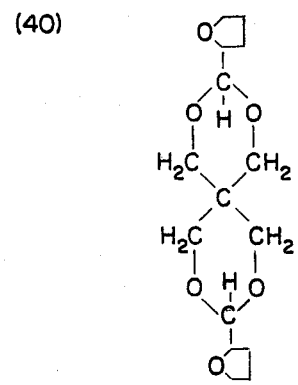

(30)

WHERE X' IS $-CH_3$ & Y' IS $-NO_2$ (30a)
OR    X' IS $-CH_3$ & Y' IS $-N$ (30b)

(DIFURFURYLIDENE PENTAERITHRITOL)

NOTE: 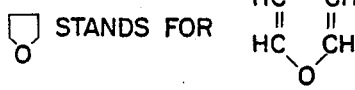 STANDS FOR ...

 STANDS FOR ...

INVENTORS:
JOHN A. MATTOR
LAWRENCE PRICE
BY, *Russell, Chittick, & Pfund*
ATTORNEYS INVENTORS:
JOHN A. MATTOR
LAWRENCE PRICE.
BY,
Russell, Chittick, + Pfund
ATTORNEYS

United States Patent Office 3,394,395
Patented July 23, 1968

3,394,395
PHOTOSENSITIVE MEDIUM COMPRISING A FURFURYLIDENE, A PRIMARY AROMATIC AMINE AND A LOWER HALOALKANE
John A. Mattor, Hollis, and Lawrence Price, Old Orchard Beach, Maine, assignors, by mesne assignments, to Scott Paper Company, Delaware County, Pa., a corporation of Pennsylvania
Continuation-in-part of application Ser. No. 351,316, Mar. 12, 1964. This application Apr. 21, 1967, Ser. No. 641,720
9 Claims. (Cl. 96—90)

ABSTRACT OF THE DISCLOSURE

A negative working photographic medium or film comprises a light-passing resinous binder containing as active materials a purified furfurylidene, a primary aromatic amine and a photosensitive lower haloalkane. The photographic medium can be developed simply by heating to above about 100° C.

Related application

This application is a continuation-in-part of Ser. No. 351,316, "Photosensitive Medium Comprising a Furfurylidene, a Primary Aromatic Amine and a Lower Haloalkane," filed Mar. 12, 1964, by the present inventors.

This invention

This invention pertains to a photographic medium which consists essentially of a transparent to translucent plastic film containing dispersed therein a furfurylidene as the color forming ingredient, a primary aromatic amine enhancer and a lower haloalkane sensitizer, specifically iodoform. The photographic medium is negative working and is usually carried as a film on a flexible support that is impervious since the film is preferably applied from a solvent solution. The furfurylidene preferably contains two or more furan rings and is also preferably either an imine or a cyclic acetal. The furfurylidene is carefully purified to remove reaction tars and other discoloring materials that are formed in its preparation.

Permanently black or colored images can be produced by the process of this invention by short exposures of the photographic medium to light ranging from blue to the near ultra-violet, specifically to light having a wave length in the range of 3,000 to 7,000 A. Image density is excellent and the range of permissible tones is quite wide. An unusual feature of the present photographic medium is that no chemical treatment is required to develop or fix the image, or to desensitize the unexposed or background areas. All that is required in the development of the image is to heat the medium to about 100–150° C. briefly for a few seconds or minutes.

It is known that organic halogen compounds, such as iodoform, decompose under the action of light, releasing hydrogen iodide. In the present invention, the iodoform and primary aromatic amine enhancer appear to form a complex in the solvent solution of the photographic medium which complex probably rearranges to a quarternary ammonium salt upon exposure to light. This salt, when heated, liberates a molecule of hydrogen halide. It is believed that the furfural derivative acts as a protected aldehyde and that the hydrogen iodide produced by the radiation acts, upon the heating of the photographic medium, on and opens the furan ring, and possibly also the acetal-imine grouping. The furan ring is known to be easily opened by both acids and bases on account of its double bonds, and hydrogen iodide is an exceptionally good reagent for the cleavage of ether linkages. The furfurylidene-hydrogen iodide reaction product then acts as a conjugate dialdehyde and reacts with the primary aromatic amine enhancer to produce alkimines and/or ring coupling. The resonance of the system is thus greatly extended causing the intense dark colorations that have been observed.

It appears that the aldehyde groups derived from the furfurylidene react with the amine group of the enhancer. In every case tested, secondary and tertiary aromatic amines have failed to give color enhancement of the image. This indicates that one essential reaction for color formation in the present invention is the reaction of primary amine groups with the dialdehyde structure with the formation of the aldimine linkage.

The data also indicate that a coupling reaction is occurring on the aromatic ring of the amine enhancer. For example, plain meta-phenylenediamine as an enhancer gives excellent images with furfurylideneazine as a color-former. When the ring is further activated as by a methoxy group the reaction is faster and the color more intense. Good images are formed with 2,4-toluenediamine. If, however, the ring is unduly substituted it appears to become deactivated or steric hindrance occurs such that ring coupling is difficult. Thus, highly substituted ring structures are not satisfactory.

During heating of the imaged photographic medium to develop the image, the iodoform is driven from the unexposed areas which prevents further reaction from occurring upon subsequent exposure to light. It will be apparent to those skilled in the art that since the sensitizer is so removed it is not necessary in any way to treat or remove the background areas to develop the image. This is a distinct advantage of the present process.

Description of the drawings

FIG. 1 illustrates one class of furfurylidenes, the furfurylidene imines, that may be used in the practice of this invention;

FIG. 2 illustrates a second class of furfurylidenes, the cyclic acetals, which may be used.

FIGS. 1 and 2 set out numerous specific furfurylidenes, each of which is given an identifying arabic numeral in parenthesis. These arabic numerals will be used hereinafter to refer to these compounds to avoid the necessity of reproducing the indicated structures.

With reference to FIG. 3, the furfurylidene is first prepared in Step 1 by reacting furfural with, for example, an amine or polyol. The reaction product is purified in Step 2 and then is admixed with a solvent and the other ingredients of the photographic medium in Step 3 to give a coating solution. The coating solution is applied to a suitable support in Step 4 and dried to leave the photographic medium in the form of a film. A print is made by exposing the film through a negative to light in Step 5 followed by heating of the exposed film in Step 6 to develop the image.

Preferred embodiment

Figure 3:
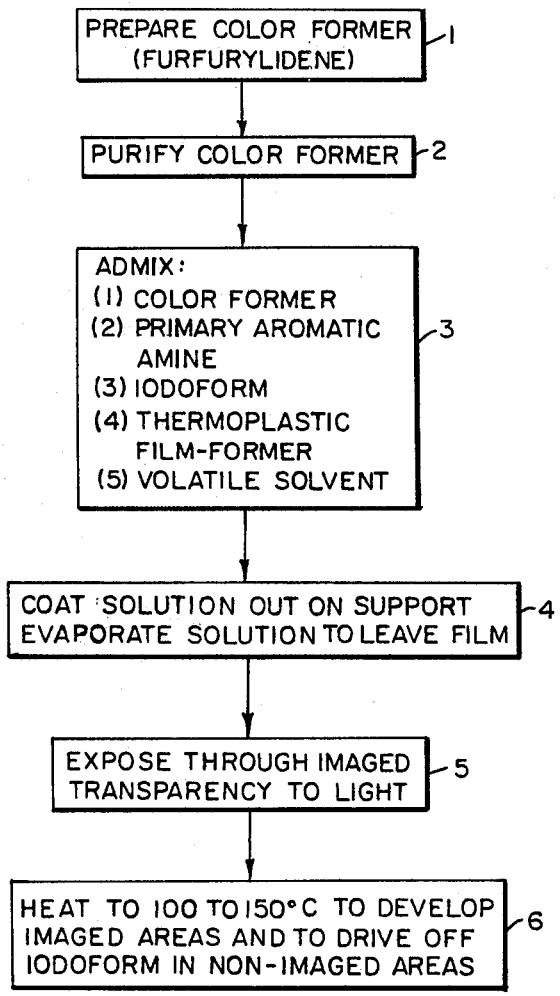
FIG. 3 schematically illustrates the steps necessary to produce a photographic image in accordance with the teachings of this invention.

In general, the haloalkane sensitizer used is a solid at room temperature having a purity of at least 98% with compounds containing 1 to 2 carbon atoms being preferred such as iodoform and pentabromethane. Iodoform and iodoform complexes such as iodoform-diethylamine are definitely preferred.

The primary aromatic amine enhancer is prepared by conventional organic synthesis such as by the reduction of nitro compounds. The enhancer is preferably a solid at room temperature and has a boiling point preferably in excess of 200° C. (atmospheric pressure). It is soluble in chloroform at room temperature to the extent of at least 10%. Its purity exceeds 98%.

The aromatic amine enhancer, besides being a primary aromatic amine, preferably contains two primary amino groups each of which is in resonance with a benzene ring and more preferably, these amino groups are in the meta position on a single ring. The benzene ring may contain up to two other functional groups but preferably contains only one and it is further preferred that a functional group be adjacent an amino group. The meta-phenylene-diamines and mono-substituted forms thereof with the substituent group being adjacent an amino group are definitely preferred. 2,4-toluenediamine and the 4,4'-dianilines also give exceptional performance as do the benzidine (see Table IV).

The furfurylidene color-former is usually prepared by reacting furfural with a suitable amine in the case of the furfurylidene imines and with a suitable glycol or higher polyol in the case of the cyclic acetals. Conventional well understood organic synthesis techniques are used. The reaction is usually a condensation reaction carried out with an acidic catalyst in an organic solvent at temperatures in the range of 80 to 120° C. It is preferred to use furfurylidenes in the photographic medium that are crystalline solids at room temperature and have melting points in the range of 70° to 225° C., but liquid furfurylidenes which boil between 100° and 220° C. at 10 mm. Hg pressure can also be used. It is preferred that the furfurylidenes be soluble in $CHCl_3$ to the extent of at least 0.02 gms./gm. at 25° C.

It is important to thoroughly purify the furfurylidene after its preparation in order to rid it of dark color bodies and reaction tars that would unduly tone or destroy the clarity of the background areas of the photographic medium. Solvent extraction and crystallization techniques have proved to be adequate in most cases although chromatographic and other more advanced techniques can be used when necessary. Generally speaking, if the purity of the furfurylidene color-former exceeds 98 weight percent it will be sufficiently pure for the purposes of this invention. The main criterion is that it be purified to the extent that it imparts no or just a slight tint of color when diluted and applied in the photographic medium. Some of the furfurylidene compounds are colored per se and may be used in situations where it is not necessary to have a white background. Where a white background or a substantially white background is desired, and the furfurylidene compound imparts a slight color or tint to the photographic medium this may be masked by the addition of dyes to the medium or by slightly coloring the support for the photographic medium, as will be understood by those skilled in the art.

At this point it might be noted that in the case of the furfurylidene imines, the amine used to prepare the imine may be the same or different from the amine used as the enhancer. It is much preferred to use an amine enhancer different from the one used in the preparation of the furfurylidene imine because much better control of intensity and color is obtained. It has been found that if the same amine is used, it is usually difficult to obtain the desired stability, intensity and depth of color.

The furfurylidene color-former, the amine enhancer and the haloalkane sensitizer are applied to a suitable support in solvent solution along with a film-forming plastic polymer. Any one of several suitable organic solvents that are volatile at room temperature or at slightly elevated temperatures can be used such as chloroform; benzene; 1,1,2 trichloroethane and methyl ethyl ketone. Mixtures of the solvents can be used to obtain improved solvation. The film-forming plastic should be essentially non-reactive with the other ingredients of the solution and desirably in the free state forms a translucent or transparent film that is colorless or substantially colorless so as not to interfere with or mask the color produced by the other ingredients in the photographic medium. Some polyester polymers have been found to be unsatisfactory presumably because the hydrogen iodide attacks the ester linkage. Polymers containing large amounts of hydroxyl groups will usually interfere with image formation. The polymer should be unaffected by concentrated aqueous solutions of hydrogen iodide at 75° F. In most cases it is desirable for the polymer to form a non-tacky film. Polymer film-formers or binders that are suitable are polystyrene, hydrogenated polyterpenes, and methyl methacrylates.

The weight ratio of primary aromatic amine enhancer to the furfurylidene color-former is usually in the range of 0.1 to 4, preferably 0.5 to 1.5. The weight ratio of haloalkane sensitizer to color-former is in the range of 0.1 to 20, preferably 0.5 to 2. The weight ratio of resin to color-former is not too important. It will usually be in the range of 1 to 40, with the lower ratios below about 5 being preferred from the standpoint of intensity. The coating solids used will normally be in the range of 10 to 20.

A photographic plate is prepared from the coating solution by applying it to a suitable support by a conventional means. The coating weight applied (dry basis) will normally be in the range of 2 to 6 pounds per ream to give a film thickness in the range of 0.05 to 0.5 mil. The thicker the film, the more intense the image.

The support used in the preparation of a photographic plate must have a suitable coated surface to withstand the penetration of organic solvents. In the case of paper, starch and potassium polyacrylate resins and similar binders will accomplish this function. In general, water soluble resins that are film-formers can be expected to give adequate solvent hold-up. In the case of transparent supports, films of polyethylene terephthalate resin (Du Pont's Mylar) have proved to be excellent supports and particularly suitable for the preparation of films for microphotographic copying. Materials such as cellophane are not usable except under special conditions because of the plasticizer present.

EXAMPLES

Reference is made to Tables I–V, infra. Table I summarizes the performance of one preferred furfurylidene, furfurylideneazine, when used with several different types of primary aromatic amine enhancers.

Table II presents specific examples of photographic mediums using five other types of furfurylidene color-formers in conjunction with three preferred enhancers. In general, the solvent solution was applied to the support by means of draw-bar coater followed by the evaporation of the solvent at room temperature. The amount of the photographic medium applied in each case was about 4 pounds per ream (dry basis).

Imaging was accomplished by means of a transparent or translucent type negative in direct contact with the photographic medium on the support exposed to a 7.7 kva. carbon arc at a distance of 24 inches for 10 seconds. After exposure, the images were developed by heating in an oven with a circulating air atmosphere to 300° F. which usually took 2 to 3 minutes. No chemical treatment was required to develop the images, to neutralize the background areas, or to remove the background areas. With proper selection of the various ingredients and their concentrations, many of the developed images were found to be stable to the presence of sunlight over a period of many months with occasionally some fading occurring. Fadeometer testing was carried out and satisfactory results were obtained.

Those skilled in the art will appreciate that the images obtained by this method do not consist of discrete small particles as is the case of the silver in conventional photographic plates. The image is formed by a color body in solid solution and thus definition is excellent without coarseness or graininess.

The almost limitless combination of color-formers and enhancers permitted by this invention permits one to make photographic plates that will produce a wide variety of tones, colors and shades. Two or more color-formers may be used in combination as may two or more enhancers to achieve specific effects. As is known, the photographic medium can be layed down in layers with each layer containing a different combination of furfurylidene color-former and amine enhancer to produce photographs consisting of many different colors.

The furfurylideneazine of Table I was prepared as follows: 0.1 lb.-mole (9.6 lb.) of furfural was mixed with 2 gallons of denatured 95% ethanol in a 22 liter round-bottom flask on a steam bath. The flask was fitted with a condenser, stirrer and 3 liter dropping funnel 0.05 lb.-mole (1.6 lb.) of hydrazine (95%) was mixed with 1.5 quarts of ethanol and placed in the dropping funnel. The furfural ethanol mixture was heated to boiling, and the hydrazine-ethanol added slowly. The steam was turned off during the addition of the hydrazine, as the reaction is exothermic. Steam was turned on after the addition was complete, and the ethanol was kept in reflux for 1 hour. One gallon of water was added, and the mixture cooled to 0° C. The yellow crystals were filtered and washed with water, then air-dried. The product was dissolved in hot chloroform, treated with anhydrous sodium sulfate (dessicant), activated carbon, and filtered. An equal volume of 90–120° C. ligroin was added to the hot chloroform solution, followed by cooling to 0° C. to precipitate the crystals. Yields from 63 to 84% were obtained. (M.P. 111–113° C.-corrected).

The difurfurylidene pentaerythritol of Table II was prepared as follows: 0.1 lb.-mole (9.6 lbs.) of furfural, ½ gallon of toluene and 0.05 lb.-mole (6.8 lbs.) of pentaerythritol were place in a 22 liter round-bottomed flask fitted with condenser and moisture trap, the flask being heated electrically by means of a mantle. 50 g. of p-toluenesulfonic acid were added, and the reaction was then slowly brought to reflux. An equivalent amount of water was collected in the moisture trap in an hours time. No more evolution was apparent and the reaction was stopped. The reaction liquor was transferred to an ice bath as soon as it could be safely handled. The crystalline product was filtered, washed with petroleum ether, and allowed to air dry. The compound was then dissolved in chloroform, treated with activated carbon, filtered, precipitated with 90–120° C. ligroin and cooled. Two crops netted a 70% yield of somewhat dark crystals, which melted at 161 to 163° C. If zinc chloride is used as catalyst instead of p-toluenesulfonic acid and the reaction is conducted at 100° without solvent, a very clean product is obtained but in lower yield.

Table III gives comments on the performances of the other furfurylidenes schematically illustrated in FIGS. 1 and 2 with the compound number in the table referring to the compound number given in parenthesis in the drawings. The color-formers were generally sensitized with iodoform and enhanced with either meta-phenylenediamine (abbreviated as MDP) or 2,4-toluenediamine (abbreviated as TDA) unless otherwise specified.

Table IV lists the many numerous enhancers that have been evaluated and found to be satisfactory.

Table V comments on the performance of the enhancers given in Table IV when tested in the manner described in conjunction with Tables I and II. The enhancers were evaluated in conjunction with furfurylideneazine, unless otherwise specified. The furfurylidene compound number designations are given in Table V only when a different furfurylidene was used.

With respect to the furfurylideneazine of Table I (Compound #10) the addition of a halogen atom in the 5 position on the furan ring materially increases the sensitivity of the photographic medium to visible light by a factor of 10 or so. It is believed that this enhancement is generally applicable to all of the furfurylidenes.

Specifically, a photographic plate was prepared from a coating solution consisting of 0.02 gram of 5-bromo furfurylideneazine; 0.06 gram 2,4-toluenediamine; 0.10 gram of iodoform; 0.2 gram of a polystyrene (Piccotex 120); 0.2 gram of another polystyrene (PS–3, The Dow Chemical Co.) and 4 ml. of chloroform applied to a paper. The plate was exposed through a trasparency using a 200 watt tungsten lamp at a distance of 12 inches for 1 minute. Heat development at 300° F. for 90 seconds produced a blue image. An equivalent plate based on the unsubstituted furfurylidenazine would require an exposure of 10–15 seconds with a carbon arc or 5–10 minutes to a 200 watt tungsten lamp.

A particularly preferred formula is the following:

|  | Parts by wt. |
|---|---|
| Polyphenyleneoxide resin (General Electric) | 2 |
| Difurfurylidene-pentaerythritol | 1 |
| 4-chloro-1,3,-phenylenediamine | 0.9 |
| Iodoform | 1 |
| Chloroform | 20 |

This particular resin seems to be able to retain the iodoform during storage of the film to a much better extent than other resins. With this formula, as with some of the others, it may be desirable to use a special subbing on the paper to improve adhesion. This formula at a coating solids level of about 15 weight percent can be used to impregnate, rather than coat, a uniformly light weight absorbent paper sheet such as a carbonizing tissue to produce a translucent appearing photographic plate, e.g., a 30 pounds per ream (25" x 28"–500 sheets) paper is impregnated with 5 pounds per ream, dry basis, of the formula. Slight changes in this formula to obtain variations in color of the image are to use 0.15 parts of meta phenylenediamine with 0.75 parts of the above amine in the formula, and alternately to use 0.05 part of 4-isopropyl phenylenediamine with 0.85 part of the amine.

TABLE I.—COLOR-FORMER

[Furfurylideneazine (Compound #10)]

| Enhancer | m-Phenylenediamine | 4-methoxy-m-phenylenediamine | 2-chloro-m-phenylenediamine | 4-ethyl-m-phenylenediamine | Methylenedianiline | 4,4'-thiodianiline |
|---|---|---|---|---|---|---|
| Compound No. | (70) | (76) | (75) | (78) | (68) | (65) |
| PBW | 4 | 2.5 | 2.5 | 1.5 | 2.5 | |
| Sensitizer | CHI₃ | CHI₃ | CHI₃ | CHI₃ | CHI₃ | CHI₃ |
| PBW | 5 | 5 | 5 | 5 | 10 | 5 |
| Film-former | Polymethyl methacrylate.[1] | Polymethyl methacrylate.[1] | Polystyrene [2] | Polystyrene [2] | Polymethylmethacrylate.[1] | Polymethylmethacrylate.[1] |
| PBW | 20 | 20 | 20 | 20 | 30 | 20 |
| Solvent | CHCl₃ | CHCl₃ | CHCl₃ | CHCl₃ | CHCl₃ | CHCl₃ |
| PBW | 180 | 160 | 160 | 160 | 220 | 160 |
| Support | Impervious Paper. | Paper | Paper | Paper | Paper | Paper. |
| Exposure time (7.7 Kva Carbon Arc, 24") secs. | 12.5 | 10 | 10 | 10 | 15 | 15 |
| Developing temp. ° C | 125 | 125 | 150 | 125 | 125 | 150 |
| Comments | Uniform black image. | Good black image pale yellow coloration in partially exposed areas. | Clean gray-black image. | Intense blue image. | Intense red image. | Intense purple image with white background. |

[1] Lucite 2009.   [2] Piccotex 120.   PBW%parts by weight, on one part by weight of the furfruylideneazine.

TABLE II

| Color-former | Difurfurylidene-p-phenylene-diamine | Difurfurylidene-biphenylene | Difurfurylidene-oxydianiline | Furfurylidene-aniline | Difurfurylidene-pentaerythritol | |
|---|---|---|---|---|---|---|
| (Compound No.) | (14) | (16a) | (18d) | (2) | (40) | |
| Enhancer | 2,4 toluene-diamine. | 2,4 toluene-diamine. | 2,4 toluene-diamine. | 2,4 toluene-diamine. | m-Phenylene-diamine. | 4-chloro-m-phenylene-diamine. (71) |
| (Compound No.) | (79) | (79) | (79) | (79) | (70) | |
| PWB | 1 | 1 | 1 | 1 | 2.5 | 6 |
| Sensitizer | CHI$_3$ | CHI$_3$ | CHI$_3$ | CHI$_3$ | CHI$_3$ | CHI$_3$ |
| PBW | 2 | 2 | 2 | 2 | 5 | 5 |
| Film-former | Polyvinyl butyral.[1] | Polyvinyl butyral. | Polyvinyl butyral. | Polymethyl-methacrylate. | Polystyrene | Polystyrene. |
| PBW | 6 | 6 | 6 | 6 | 15 | 15 |
| Solvent | CHCl$_3$ | CHCl$_3$ | CHCl$_3$ | CHCl$_3$ | CHCl$_3$ | CHCl |
| PBW | 60 | 60 | 60 | 60 | 120 | 150 |
| Support | Mylar | Mylar | Paper | Paper | Paper | Paper. |
| Exposure time Secs. | 15 | 15 | 15 | 10 | 10 | 10 |
| Developing temp. °C | 125 | 125 | 100 | 100 | 150 | 125 |
| Comments | Intense black image stable to heat and light. | Black image on pale yellow background. | Black image on pale yellow background. | Intense black image. | Completely gray image on white background. | Excellent purple image on white background |

[1] Butvar; Shawinigan Resins Corporation, Springfield, Massachusetts.

TABLE III.—COMMENTS ON PERFORMANCE OF COMPOUNDS LISTED IN FIGURES 1 AND 2

| Compound No. | Physical Properties | Comments |
|---|---|---|
| (1) | M.P. 40.5–91.0° C | Not as good as the azine (#70) but adequate (TDA). |
| (2) | Distillable oil | See Table II. |
| (3) | Pale brown solid | Excellent blue with good contrast, yellow background (3,3' Dimethoxy benzidine, #91). |
| (4) | M.P. 80.5–81.0° C | Good color-former (TDA). |
| (5) | Distillable oil | Good black image on pale olive. Good contrast (TDA). |
| (6) | Used crude | Deep red image (p-naphthylamine). |
| (7) | Yellow solid | Good color-former (TDA). |
| (10) | M.P. 110–111.5° C | One of the best color-formers. Colorless background, black images (TDA, MPD, and others). |
| (11) | 250° C. (Dec.) | Excellent images (TDA). |
| (12a) | B.P. (230° C., 20 mm.) | Good, black image (TDA). |
| (12b) | An oil | Black images, yellow background (TDA). |
| (12c) | Yellow solid | Intense black image on cream-yellow background (TDA). |
| (13) | Tan solid | Interesting gray and green image (TDA). |
| (14) | M.P. 164–165° C | See Table II. |
| (15) | M.P. 173–174° C | Superb black images on yellow background (TDA). |
| (16a) | M.P. 222° C | See Table II. |
| (16b) | M.P. 184–185° C | Black images on yellow background (TDA). |
| (17) | M.P. 118–120° C | Intense image with 3,3' dimethoxybenzidine (#91). |
| (18a) | M.P. 167–167.5° C | Intense black image (TDA). |
| (18b) | Red oil | Black image on yellow background (TDA). |
| (18c) | Oil, solid at −20° C | Red image with no enhancer. |
| (18d) | M.P. not sharp | See Table II. |
| (18e) | M.P. 109–111° C | Purple images with TDA. |
| (18f) | Pale yellow solid | Intense red image when enhanced with #69. |
| (20) | M.P. 210.5–212.5° C | Magnificent images, faded on heating (TDA). |
| (30a) | M.P. 97° C | Good color-former. Gives greenish image (MPD) About 150° C. needed to develop. |
| (30b) | M.P. 89–90° C | |
| (40) | M.P. 161–163° C | See Table II. |

TABLE IV.—ENHANCES PRIMARY AROMATIC AMINES

| One Amine group only on Benzene Ring and Paraphenylene diamines (and related structures) | Two Amine groups in meta-position on single Benzene Ring and benzidenes (preferred) |
|---|---|
| One Amine group on Benzene Ring | Meta phenylene diamines (abbreviated as MPD) |
| (50) p-Hydroxy-aniline | (70) MPD. |
| (51) 2 amino-naphthalene | (71) 4 chloro, MPD. |
| (52) 1,5 diamino-naphthalene | (72) 4 fluoro, MPD. |
| (53) p-methoxy aniline | (73) 4 iodo, MPD. |
| | (74) 4 bromo, MPD. |
| Para phenylene diamines (and related structures) | (75) 2 chloro, MPD. |
| (60) p-Phenylenediamine | (76) 4 methoxy, MPD. |
| (61) p-Aminodiphenylamine | (77) 4 ethoxy, MPD. |
| (62) 2-chloro-p-phenylenediamine | (78) 4 ethyl, MPD. |
| (63) 2,6 dichloro-p-phenylene diamine. | (79) 4 methyl, MPD (or 2,4 toluenediamine). |
| (64) 2,4 diamino-diphenylamine | (80) 4 phenoxy, MPD. |
| (65) 4,4' thiodianiline* | (81) 1,3 diamine-4-4' thiodibenzene. |
| (66) 4,4' oxydianiline* | (82) 4(2' napthol) (MPD) |
| (67) 2 amino-4,4' oxydianiline | (83) 4(4' chloro, 3' methyl-phenoxy) MPD. |
| (68) 4,4' methylene-dianiline* | Benzidines. |
| | (90) Benzidine. |
| | (91) 3,3' dimethoxybenzidine. |
| | (92) 3,3' diethoxybenzidine. |

*Compounds that are also preferred.

TABLE V.—COMMENTS ON PERFORMANCE OF ENHANCERS LISTED IN TABLE IV

| Compound No. | Physical Properties | Comments |
| --- | --- | --- |
| (50) | M.P. 187-189° C | Good red image, clean background. |
| (51) | M.P. 110.2° C | Red image. Clean background. |
| (52) | M.P. 189.5° C | Purple-brown image. Poor solubility. |
| (53) | M.P. 57-58° C | Good red image, fades in light. |
| (60) | M.P. 139-141° C | Intense image. |
| (61) | M.P. 66-67° C | Intense blue image, pale blue background. |
| (62) | M.P. 62.5-64.5° C | Good brown-black image. |
| (63) | M.P. 123.5-125.5° C | Brilliant violet image. |
| (64) | B.P. 245° C. at 15 mm | Good black image, but compound oxidizes easily. |
| (65) | M.P. 109-111° C | Deep purple image; white background. Fades in light. |
| (66) | M.P. 190-192° C | Good red image, fades in light. |
| (67) | Brown oil | Black image with azine. |
| (68) | M.P. 88-93° C | Intense red-brown image. |
| (70) | M.P. 62.8° C | Black image on colorless background. May yellow in partially exposed areas. |
| (71) | M.P. 87.5-90° C | Superb enhancer. Purple to black image, colorless background. |
| (72) | Brown oil | Purple image. |
| (73) | M.P. 62.5-65° C | Blue image with polystyrene as binder. |
| (74) | M.P. 64.0-65.5° C | Black image with Lucite 2009 as binder. |
| (75) | M.P. 85-86° C | Black image, white background. |
| (76) | B.P. 187° C. (20 mm.) | Excellent black image. |
| (77) | M.P. 66.0-67.5° C | Do. |
| (78) | B.P. 155° C. (10 mm.) | Excellent deep blue image. |
| (79) | M.P. 97-100° C | Black-blue image on pale brown to colorless background. |
| (80) | M.P. 65.5-67.5° C | Good black image, yellow in partially exposed areas. |
| (81) | M.P. 106.0-108.0° C | Excellent steel-gray image. |
| (82) | Red oil | Black image, unclean background. |
| (83) | Brown oil | Obtained as an oil, black image. |
| (90) | M.P. 139-141° C | An extremely variable enhancer. Can give positive images. |
| (91) | M.P. 137-140° C | Crisp blue image, pale yellow background. Fades on exposure to light. |
| (92) | M.P. 110-114° C | Good blue image. Fades to brown in light. |

We claim:
1. A photographic medium comprising a light-passing binder containing dispersed therein in photographic amounts and proportions:
    (a) as a color-former, a purified furfurylidene,
    (b) as an enhancer, a primary aromatic amine,
    (c) as a sensitizer, a photosensitive lower haloalkane.

2. The photographic medium of claim 1 wherein said furfurylidene is prepared from furfural and is substantially free of any dark colored side reaction products, said furfurylidene being selected from the group consisting of furfurylidene imines and furfurylidene cyclic acetals, wherein said primary aromatic amine has at least two amino groups each in resonance with a benzene ring, wherein said lower haloalkane comprises iodoform.

3. The photographic medium of claim 1 wherein said furfurylidene is difurfurylidene pentaerythritol and said sensitizer is iodoform.

4. A photographic plate consisting of the photographic medium of claim 1 carried as a thin film on a support.

5. A negative working photographic medium comprising a translucent to transparent film of a thermoplastic containing dispersed therein in photographic amounts:
    (a) as a color-former, a furfurylidene soluble to the extent of at least 0.02 gms./gm. in CHCl₃ at 25° C. and having prior to incorporation into said thermoplastic a purity in excess of 98%;
    (b) as an enhancer, a primary aromatic amine having at least one amino group in resonance with a benzene ringe and a boiling point in excess of 200° C., in an amount in the range of 0.1 to 4 parts by weight based on said furfurylidene; and
    (c) as a sensitizer, an organic halogen compound that produces a free halogen acid upon exposure to electromagnetic radiation having a wave length in the range of 3000 to 7000 A. in an amount in the range of 0.1 to 20 parts by weight based on said furfurylidene; said furfurylidene having a structure selected from the group consisting of:

I
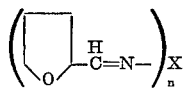

and

II
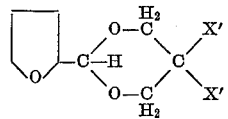

wherein: n is a whole integer having value in the range of 1 to 2 inclusive; with X, when n is 1, being selected from the group consisting of hydroxyl, amino, phenyl, and naphthyl radicals and when n is 2, being absent or selected from the group consisting of phenylene, naphthylene and biphenylene radicals; and X' is selected from the group consisting of methyl, nitro, and furfurylidene imine radicals and a carbon atom forming a part of a cyclic acetal ring with the other X' to give a difurfurylidene pentaerythritol.

6. The photographic medium of claim 5 wherein said furfurylidene is the reaction product of furfural and an amine and said enhancer is an amine different from the amine used in the preparation of said furfurylidene, and wherein said sensitizer is selected from the group consisting of odoform and iodoform complexes.

7. The photographic medium of claim 5 wherein said enhancer is selected from the group consisting of:
    (a) meta-phenylene diamines having no more than one additional function group, said functional group being adjacent an amino group when present;
    (b) benzidenes;
    (c) and dianilines containing in the 4, 4' position a radical selected from the group consisting of methylene, thio and oxy radicals.

8. A process for preparing a photographic medium comprising, in combination, the steps of:
    (a) reacting furfural with an organic compound to produce a furfurylidene;
    (b) purifying said furfurylidene to a purity of at least 98%;
    (c) solvating said furfurylidene in a volatile organic solvent along with (1) in the range of 1 to 40 parts by weight based on furfurylidene of a colorless thermoplastic film-forming resin and (2) a primary aromatic amine having an amino group in resonance with a benzene ring, and iodoform in the proportions of:

| | |
|---|---|
| Furfurylidene | 1 |
| Amine | 0.1 to 4 |
| Iodoform | 1 to 20 | the solids content of the solution being in the range of 10 to 20 weight percent;

(d) casting a film from said solution and evaporating said solvent to obtain a coherent film having a thickness in the range of 0.05 to 0.5 mils.

9. The process of claim 8 wherein said solution is cast out on an impervious flexible support to which said coherent film adheres.

References Cited

UNITED STATES PATENTS

| | | | |
|---|---|---|---|
| 3,147,117 | 9/1964 | Wainer et al. | 96—90 |
| 3,202,507 | 8/1965 | Sprague et al. | 96—90 |

J. TRAVIS BROWN, *Primary Examiner.*

C. E. DAVIS, *Assistant Examiner.*

UNITED STATES PATENT OFFICE
CERTIFICATE OF CORRECTION

Patent No. 3,394,395                                  July 23, 1968

John A. Mattor et al.

It is certified that error appears in the above identified patent and that said Letters Patent are hereby corrected as shown below:

Column 9, line 61, "ringe" should read -- ring --. Column 10, line 54, "odoform" should read -- iodoform --; line 59, "function" should read -- functional --; line 61, "benzidenes" should read -- benzidines --.

Signed and sealed this 10th day of March 1970.

(SEAL)
Attest:

Edward M. Fletcher, Jr.
Attesting Officer

WILLIAM E. SCHUYLER, JR.
Commissioner of Patents